US012755348B2

(12) United States Patent
Pfaff et al.

(10) Patent No.: US 12,755,348 B2
(45) Date of Patent: Oct. 6, 2026

(54) TRAINING METHOD FOR A SYSTEM FOR DE-NOISING IMAGES

(71) Applicant: Siemens Healthineers AG, Forchheim (DE)

(72) Inventors: Laura Pfaff, Lohr (DE); Tobias Würfl, Erlangen (DE); Marcel Dominik Nickel, Herzogenaurach (DE); Thomas Benkert, Neunkirchen am Brand (DE)

(73) Assignee: Siemens Healthineers AG, Forchheim (DE)

( * ) Notice: Subject to any disclaimer, the term of this patent is extended or adjusted under 35 U.S.C. 154(b) by 393 days.

(21) Appl. No.: 18/591,456

(22) Filed: Feb. 29, 2024

(65) Prior Publication Data

US 2024/0296524 A1 Sep. 5, 2024

(30) Foreign Application Priority Data

Mar. 2, 2023 (EP) .................................... 23159764

(51) Int. Cl.
*G06T 5/60* (2024.01)
*G06T 5/50* (2006.01)
*G06T 5/70* (2024.01)

(52) U.S. Cl.
CPC .................. *G06T 5/60* (2024.01); *G06T 5/50* (2013.01); *G06T 5/70* (2024.01); *G06T 2207/10088* (2013.01); *G06T 2207/20081* (2013.01); *G06T 2207/20216* (2013.01)

(58) Field of Classification Search
CPC .... G06T 5/60; G06T 5/50; G06T 5/70; G06T 2207/10088; G06T 2207/20081; G06T 2207/20216; G06T 2207/20028; G06T 2207/30081
See application file for complete search history.

(56) References Cited

U.S. PATENT DOCUMENTS 5,113,865 A * 5/1992 Maeda ................. G01R 33/565
324/309
6,842,001 B2 * 1/2005 Ikezaki ............ G01R 33/56554
324/309
2022/0180574 A1 * 6/2022 Mailhe ............... G01R 33/5611

OTHER PUBLICATIONS

Metzler C. et al.: "Unsupervised Learning with Stein's Unbiased Risk Estimator", arXiv preprint arXiv:1805.10531, 2018.
(Continued)

*Primary Examiner* — John B Strege
(74) *Attorney, Agent, or Firm* — Banner & Witcoff, Ltd.

(57) ABSTRACT

A training method for a system with a machine learning model for de-noising images, including: providing numerous image datasets, wherein each image dataset includes a plurality of complex-valued image repetitions; performing a phase correction on the image repetitions, wherein for each provided image repetition of an image dataset a phase-corrected signal image is calculated by amending the phase of the complex-valued image repetition such that the phases of the image repetitions of the image dataset are consistent and such that the signal image comprises signal contribution of the image repetition; calculating a noise map for an image dataset based on the standard deviation between the signal images of this image dataset; and training the machine learning model based on the signal images, the noise map, and a loss function based on Stein's unbiased risk estimator.

20 Claims, 3 Drawing Sheets

(56) References Cited

OTHER PUBLICATIONS

Song B. et al.: "Adaptive BM3D Algorithm for Image Denoising Using Coefficient of Variation", in 2019 22th International Conference on Information Fusion (FUSION), pp. 1-8. IEEE, 2019.
Prah D.E. et al., "A Simple Method for Rectified Noise Floor Suppression: Phase-Corrected Real Data Reconstruction with Application to Diffusion-Weighted Imaging", Magn Reson Med., 64(2):418-29, 2010.
Lehtinen, J. et al.: "Noise2Noise: Learning Image Restoration without Clean Data", Proceedings of the 35th International Conference on Machine Learning, 2018, arXiv:1803.04189.
Zhang Xinyuan et al.: "Denoise Diffusion-Weighted Images Using Higher-Order Singular Value Decomposition"; Neuroimage; vol. 156; Apr. 15, 2017; pp. 128-145, XP55480675; Amsterdam; Nlissn: 1053-8119, 001: 10.1016/j.neuroimage.2017.04.017.
Anand CS et al.: "Wavelet Domain Non-Linear Filtering for MRI Denoising", Magnetic Resonance Imaging; Elsevier Science; Tarrytown, NY, US vol. 28; No. 6, Jul. 1, 2010; pp. 842-861; XP27093174; ISSN: 0730-725X.
Nickel, M. D., et al.: "Machine-learning-based Denoising of Complex Magnetic-Resonance-Imaging Data Using a Guidance Map" Siemens AG, 2021.
Simi V.R. et al.: "Prospect of Stein's Unbiased Risk Estimate as Objective Function for Parameter Optimization in Image Denoising Algorithms—A Case Study on Gaussian Smoothing Kernel"; 2019 International Conference on Data Science and Engineering (ICDSE); IEEE; Sep. 26, 2019; pp. 149-153; XP33700128; 001:10.1109/ICDSE47409.2019.8971487.
Stein, Charles M., "Estimation of the Mean of a Multivariate Normal Distribution", The annals of Statistics (1981): 1135-1151.; 1981.
Wagner F. et al., "Ultra Low-Parameter Denoising: Trainable Bilateral Filter Layers in Computed Tomography", Medical Physics, 2022.

* cited by examiner

TRAINING METHOD FOR A SYSTEM FOR DE-NOISING IMAGES

TECHNICAL FIELD

The disclosure pertains to a training method for a system for de-noising images, such a system, a method for de-noising an image, and a magnetic resonance imaging system.

BACKGROUND

Noise is a problem throughout the field of image acquisition. Especially for MR images acquired with low-field scanners, a low signal-to-noise ratio (SNR) is a common issue that can result in degraded image quality and reduced clinical value.

For example, Diffusion-weighted imaging (DWI) generates an image contrast by measuring the rate of water diffusion within tissues. In general, DWI is an important tool especially for the detection of strokes and the characterization of tumors, since it provides additional information about the tissue properties that is often not visible in conventional contrasts like T1- or T2-weighted images.

The rate of water diffusion is usually assessed along various directions to consider both anisotropic and isotropic diffusion. These images acquired with different gradient directions and strengths, generally referred to as diffusion encoding, are usually not viewed separately but combined into a single trace-weighted image for diagnosis. This is done by computing the geometric mean over all acquired directions. Consequently, the trace-weighted image is only characterized by the b-value that describes a weighting with the isotropic diffusion component. That is the same as all diffusion encodings used to calculate it.

One major drawback of DWI is that the images, especially those acquired with higher b-values, suffer from inherently low signal-to-noise ratio (SNR) due to the diffusion weighting and long echo times necessary to accommodate the additional gradient pulses. As a result, in some body regions, the individual repetitions are hardly usable for the diagnosis.

The current common practice is to acquire multiple repetitions of an image and then compute the arithmetic average over these repetitions to achieve an enhanced SNR. However, acquiring many repetitions is time-consuming and the averaged result is prone to motion artifacts.

In addition, it must be noted that the images after reconstruction are complex-valued with normally distributed noise. There are two main techniques how to combine the images. Either one calculates the magnitude over each image first, and then the mean value or one calculates the mean value over the complex-valued images and, in the end, the magnitude.

However, the drawback of calculating the magnitudes first is that the noise in the magnitude images is no longer Gaussian and not zero-centered, and consequently, due to the averaging operation, a bright halo effect is visible around the object of interest.

On the other hand, the drawback of averaging the complex images is that there are phase variations that occur from one repetition to another, which results in a severe loss of signal.

One possible solution to improve the SNR of diffusion-weighted images is acquiring even more repetitions for averaging. However, the problem of low time efficiency and motion effects remains.

When it comes to deep learning-based de-noising, there are two possible strategies: supervised learning, i.e., learning a mapping between noisy input and noise-free target image, as well as unsupervised learning, i.e., training a de-noiser without noise-free target image. As the noise problem is inherent, it is rather infeasible to acquire noise-free images for supervised training. At most, one could use simulated data, which, however, would have to be extremely true-to-life and available in large quantities.

In the context of unsupervised learning, there are common methods, such as Noise-to-Noise (also “Noise2Noise”, see, e.g., J. Lehtinen, et al. “Noise2noise: Learning image restoration without clean data”, arXiv preprint arXiv: 1803.04189, 2018), that could be employed for this problem. However, experiments have shown that Noise2Noise is prone to significant loss of resolution in the resulting images.

There are also conventional, i.e., non-learning-based methods like BM3D (see, e.g., B. Song et al. “Adaptive BM3D algorithm for image denoising using the coefficient of variation”; In 2019 22th International Conference on Information Fusion (FUSION), pages 1-8. IEEE, 2019), but over the last few years, deep learning-based denoising methods have shown superior performance by learning representations from large amounts of data.

It is also possible to use Stein’s unbiased risk estimator (SURE) to train a de-noiser network without any noise-free data. SURE was first proposed by Charles Stein in 1981 (see C. Stein “Estimation of the mean of a multivariate normal distribution,” The Annals of Statistics, pages 1135-1151, 1981).

SURE provides a statistical method to estimate the mean squared error (MSE) between the unknown mean x of a Gaussian distributed signal y and its estimate x'=f(y). This can be adapted to an image de-noising problem, as shown by Metzler et al. (see “Unsupervised learning with Stein’s unbiased risk estimator,” arXiv preprint arXiv:1805.10531, 2018). Here, the goal is to reconstruct an unknown noise-free image x corrupted by Gaussian noise $\eta$ from a noisy image $y=x+\eta$. Since the noise is additive and has zero mean, the unknown noise-free image x can be considered as the mean vector of the noisy image y.

The original SURE expression assumed the presence of spatially invariant Gaussian noise. In order to properly address the spatially variant noise enhancement in reconstructed MR images, we extended the SURE approach accordingly by incorporating a noise map $\sigma$ that indicates the standard deviation of the noise for every pixel.

Consequently, SURE can be used as a loss function to train a neural network f that receives noisy measurements y as input and predicts an estimate of x as output by minimizing SURE (over the pixel d of the total number of pixels D and the noise maps $\sigma$), i.e., the estimated MSE as follows:

$$\frac{1}{D}\|f(y)-x\|^2 = \frac{1}{D}\|f(y)-y\|^2 - \frac{1}{D}\sum_{d=1}^{D}\sigma_d^2 + \frac{2}{D}\sum_{d=1}^{D}\sigma_d^2\frac{\partial f_d(y)}{\partial y_d}. \tag{1}$$

The coefficients $\sigma_d$ are elements of the noise maps $\sigma$, i.e., the noise level, i.e., the standard deviation of the noise of single pixels d. Simple values could be used that represent noise.

However, using images with inherently low signal-to-noise-ratio, e.g., as in diffusion-weighted imaging, all these unsupervised training methods do not lead to optimal results. In this regard, de-noising single images is very difficult since the individual repetitions often do not contain enough signal content. This problem can be mitigated by averaging several image repetitions. However, the averaging of complex-valued image repetitions often results in signal loss due to phase instabilities between image repetitions. On the other hand, when using individual repetitions of magnitude images to enhance SNR, SURE cannot be applied due to their non-Gaussian noise distribution.

SUMMARY

It is an object of the aspects of the disclosure to improve the known devices and methods to provide a system for de-noising images and to facilitate an optimized de-noising of images.

A training method, according to the disclosure, is applicable for training a (machine learning) system for de-noising images. This system comprises an input interface and a machine learning model (a de-noising model) having an architecture designed for de-noising images provided by the input interface. The training method is especially applicable in the case where there are repetitions of images with low signal-to-noise ratio (SNR), and it comprises the following steps:

- providing numerous image datasets as input for the system, wherein each image dataset comprises a plurality of complex-valued image repetitions (images being repetitions of independent measurements of the same region of interest with the same acquisition parameters),
- performing a phase correction on the images, wherein for each provided image repetition of an image dataset a phase-corrected signal image is calculated by amending the phase of the (respective) complex-valued image repetition such that the phases of the image repetitions of the dataset are consistent and such that the signal image comprises (especially all of the) signal contribution of the image repetition,
- calculating a noise map for an image dataset based on the standard deviation between the signal images of this image dataset,
- training the machine learning model based on the signal images, the noise map, and a loss function based on Stein's unbiased risk estimator.

Systems to be trained with this training method are well known in the art. However, it was not possible to train them accurately for image repetitions with low SNR.

The image repetitions show the same region of interest (RoI). They are acquired with the same acquisition parameters. Thus, all image repetitions are comparable. With "acquisition parameters," the parameters relevant to the content of an image are meant. Regarding conventional photos, these parameters especially define the view (distance and angle) but could also comprise information about spectral issues or exposure time. Regarding preferred MRI images, the acquisition parameters could refer to a contrast, to gradient directions, to gradient strength, to a slice position or, in the field of DWI, to diffusion encodings and/or b-values.

The images of the image datasets may be conventional photos, however, the disclosure is especially advantageous for all imaging techniques where multiple repetitions are acquired, preferably for medical images like CT-images or MRI-images, especially for diffusion weighted imaging (DWI).

As input images for the training method, a large number of image datasets are provided (tenth, hundreds, thousands, or more). Since the training method preferably deals with unsupervised learning, the images of an image dataset could simply be recorded without needing any ground truth. Each image dataset comprises a plurality of complex-valued image repetitions. As said above, these image repetitions are repetitions of independent measurements of the same region of interest with the same acquisition parameters, especially with the same diffusion encoding and/or b-value for MRI images. The images are preferably DWI image repetitions.

Since effective training needs a great number of data, it is preferred to use a great number of image datasets. The "nature" of datasets biases the accuracy of the system and the field of application. The image datasets could be acquired with the same acquisition parameters or with different acquisition parameters, especially different diffusion encodings and/or different b-values. However, the image datasets could also show different objects for effective de-noising arbitrary images.

It should be noted that the disclosure deals with the problem of noisy image repetitions. Thus, all image datasets could (should) comprise image repetitions acquired with low SNR.

As said above, the images are "complex-valued." This means that each image of the image repetitions comprises at least two independent image contributions. In MRI imaging, there is usually a real image and an imaginary image when reconstructing the acquired k-space. Thus, each image repetition may be a complex image. However, "complex-valued" also means that the images could also comprise other image contributions, as long as one of these contributions can be treated like the real image and another could be treated as imaginary image. For example, an image repetition may also be vector-like with a first image component and a second image component.

This is important for the following phase correction. It should be noted that phases vary over the repetitions. Thus, regarding the image repetitions, it is not possible to get an averaged noise map due to a non-consistent noise distribution. This is due to phase instabilities. The complex-valued repetitions always have a Gaussian noise distribution, and the phase correction removes phase instabilities while preserving the Gaussian noise distribution, which is needed for training with SURE. One special effect of the disclosure is that the contributions of the parts of the complex-valued images are now shifted by the phase correction to solve this problem and produce an aligned Gaussian noise distribution. The variation of noise could be assumed to be spatially smooth. A background phase can, e.g., be determined by low-pass filtering the individual image repetitions. For example, regarding complex-valued image repetitions with Gaussian noise distributions but non-Gaussian noise distribution in the magnitude images, a phase correction could shift the combined signal (the magnitude image) of each image repetition into the real part of a complex space and maintain the Gaussian noise distribution.

With the phase correction, each image repetition of an image dataset could be split up into a signal image comprising signal contribution and a noise image comprising only phase-related noise contribution (the noise image is not needed and could be ignored). This could preferably be achieved by rotating the complex-valued image in its image space. In the case the image is a complex image with a real image and an imaginary image, this image could be rotated in complex space around the angle x with the function $e^{ix}$. Regarding a vector-like image with two image components, the phase correction could be achieved with a rotation in the vector space.

Although the correction does not necessarily have to be a pure rotation (it could also be or comprise a stretching or shortening), a pure rotation is advantageous since it is very easy to calculate.

It is important that the phases of the image repetitions are shifted such that the phases of the image repetitions of the dataset are consistent. Since all image repetitions may have different phases (concerning their signal and noise distribution), the case could occur that every image repetition needs an individual correction, e.g., an individual phase-rotation angle. As said above, it is preferred that the correction shifts the signal contribution of all image repetitions such that they all have the same phase, e.g., such that the signal contribution lies in the real part of a complex space. Thus, the signal contribution could easily be identified, and this part of the image repetitions could be taken as signal images.

It is particularly preferred to perform a phase correction as described by D. E. Prah et al. (A simple method for rectified noise floor suppression: Phase-corrected real data reconstruction with application to diffusion-weighted imaging"; Magn Reson Med., 64(2):418-29, 2010) on the individual image repetitions. With this correction method, it is possible to compute averages over the complex-valued images without signal loss while also preserving the zero-centered Gaussian noise distribution. This property also makes the images eligible for unsupervised deep learning-based denoising using SURE.

Since multiple repetitions are acquired for each slice image, the required spatially resolved noise map incorporated in the SURE loss can simply be generated by calculating the standard deviation between the image repetitions for each pixel.

Now, there are phase-corrected image repetitions with a signal image (and possibly also a noise image comprising only noise). It should be noted that there is still a serious noise contribution in the signal images. The noise map for an image dataset is calculated based on the standard deviation between the signal images of this image dataset. This results in an accurate noise map directly depending from the noise of the images used for training.

With the signal images and the noise map, the machine-learning model of the system can now be trained. Since SURE is used for training, a loss function based on Stein's unbiased risk estimator is used.

The special aspect of SURE is that information about the local noise distribution is used in the form of a noise map. SURE then allows the noisy image (input image) and noise map to be used instead of a noise-free ground truth. Shortly outlining the very principle, the training is coordinated in such a way that the (assumed) noise-free image x matches the noisy image y (input image) within the framework of the noise map σ. Noise-free ground truth is not needed. The noisy image y (input image) is fed into the system, which has the various trainable parameters (filter parameters). With the help of the network output and the noise map σ, the SURE loss (=cost function) can be calculated according to above formula (1):

$$\frac{1}{D}\|f(y)-x\|^2 = \frac{1}{D}\|f(y)-y\|^2 - \frac{1}{D}\sum_{d=1}^{D}\sigma_d^2 + \frac{2}{D}\sum_{d=1}^{D}\sigma_d^2\frac{\partial f_d(y)}{\partial y_d}.$$

The factor D does not influence praxis, so this formula could also be simplified to read:

$$\|f(y)-x\|^2 = \|f(y)-y\|^2 - \sum_{d=1}^{D}\sigma_d^2 + 2\sum_{d=1}^{D}\sigma_d^2\frac{\partial f_d(y)}{\partial y_d}.$$

In the course of the training, gradients are determined for the various parameters according to the SURE loss and these are successively adjusted. In this procedure, i.e., an input image is fed into the system, SURE loss is calculated with the output of the system and the noise map, then the network parameters are updated, is repeated until the loss converges, i.e., the loss is minimized.

The basic idea of SURE is that one can estimate the MSE (mean squared error) without knowing the noise-free image x of formula (1). Instead, only the noise map σ is needed. A noise map could be present as an individual map, or it can be integrated (e.g., as a special formula) in a SURE algorithm or a loss function. In short, the output of the filters should be noise free. Thus, it should optimally be like x. Therefore, the SURE loss should be very near 0, and the right side of (1) should also be near 0.

At the beginning, the network parameters are initialized (often randomly), which means there is usually an output that is not good at the beginning. The loss is, therefore, the highest at the beginning. With the correct setting of the parameters during the training process, the output gets better and better, and the loss is lower.

A system according to the disclosure for de-noising an image comprising an input interface and a machine learning model having an architecture designed for de-noising images provided by the input interface, wherein the machine learning model is trained with a training method according to the disclosure, as described above and in the following. The system preferably comprises a plurality of bilateral filters, especially connected in a serial connection, wherein at least an output of a first bilateral filter is used as input for a second bilateral filter.

A method according to the disclosure for de-noising an image with a system according to the disclosure comprises the following steps:

- providing an image dataset as input for the system, wherein each image dataset comprises a plurality of complex-valued image repetitions, especially MRI images showing diffusion in the same region of interest and are acquired with different acquisition parameters, especially different diffusion encodings and/or different b-values,
- performing a phase correction on the images, wherein for each provided image repetition of an image dataset a phase-corrected signal image is calculated by amending the phase of the complex-valued image repetition such that the phases of the image repetitions of the dataset are consistent and such that the signal image comprises signal contribution of the image repetition,
- de-noise the signal images of the image datasets with the system,
- outputting a number of de-noised images.

It is preferred that a plurality of image datasets is provided with image repetitions, with each image dataset acquired with different acquisition parameters. Preferred images are MRI images acquired with different diffusion encodings.

It is further preferred that averaged signal images be calculated from the individual image datasets. Then, these averaged signal images are de-noised.

It is further preferred that in the case multiple de-noised images are outputted, especially a stack of de-noised images (e.g., a multi-channel image), a geometric mean value is calculated over the outputted de-noised images in order to form an averaged de-noised image. In DWI, the geometric mean value is preferably created over different diffusion encodings and/or different diffusion directions, especially to form a trace image.

A magnetic resonance imaging system (MRI system), according to the disclosure, comprises a system according to the disclosure and is preferably also designed to train this system according to a training method according to the disclosure.

Some units or modules of the system mentioned above can be completely or partially realized as software modules running on a processor of a respective computing system, e.g., of a control device of a magnetic resonance imaging system. A realization largely in the form of software modules can have the advantage that applications already installed on an existing computing system can be updated, with relatively little effort, to install and run these units of the present application. The object of the disclosure is also achieved by a computer program product with a computer program that is directly loadable into the memory of a computing system and which comprises program units to perform the steps of the inventive method, at least those steps that could be executed by a computer when the program is executed by the computing system. In addition to the computer program, such a computer program product can also comprise further parts such as documentation and/or additional components, as well as hardware components such as a hardware key (dongle, etc.) to facilitate access to the software.

A computer-readable medium such as a memory stick, a hard disk, or other transportable or permanently installed carrier can serve to transport and/or store the executable parts of the computer program product so that these can be read from a processor unit of a computing system. A processor unit can comprise one or more microprocessors or their equivalents.

Particularly advantageous aspects and features of the disclosure are given by the dependent claims, as revealed in the following description. Features of different claim categories may be combined as appropriate to give further aspects not described herein.

According to a preferred training method, wherein the phase correction (for the separation of signal and phase-related noise) is performed by rotating the image repetitions in an image space. Such image space could be a vector space. However, it is preferred that the image repetitions are complex images with a real image part and an imaginary image part wherein values of the image repetitions are rotated in complex space. It is also preferred that the rotation is such that the part of the image space with the phase-related noise contribution (especially the imaginary part) is the noise image, and the other part of the image space is the signal image. As already mentioned above, such rotation is an advantageous tool for separating noise from signal. The method of Prah et al. is especially preferred. It should be noted that the signal image typically still comprises noise. In praxis, a complex image can be rotated in complex space such that noise is rotated into the imaginary part and signal contribution is rotated into the real part.

According to a preferred training method, image datasets are acquired with different acquisition parameters. Then, each image dataset is phase-corrected individually, and a noise map is calculated for each image dataset. It is preferred that the image repetitions of each image dataset are MRI images, and each image dataset is acquired with an individual diffusion encoding and/or an individual b-value.

It is preferred that after the phase correction, signal images of the same image dataset (i.e., acquired with the same acquisition parameters) are combined as one average signal image. For creating an average image, it is preferred that an arithmetic average is computed over the phase-corrected image repetitions (especially only the signal images). It should be noted that the noise map does not need to be averaged since it is the standard deviation over multiple image repetitions of an image dataset. However, averaging improves the SNR.

When averaging, it is preferred to scale the averaged noise map. This could be achieved by dividing the averaged noise map by square root of N, where N is the number of repetitions for averaging.

Preferably, signal images (the phase-corrected image repetitions without a noise contribution), especially averaged signal images, of the different image datasets (i.e., acquired with different acquisition parameters) are stacked to form a combined signal image. It is preferred that the combined signal image comprises signal contributions of all acquired images. Such combined signal image could be used as a multi-channel input to a neural network. Preferably, this combined signal image is a stack of a plurality of two-dimensional averaged signal images, all acquired with different acquisition parameters.

It should be noted that for a de-noising method, the input to the trained system should be similar to the training data. Thus, when the system is trained with individual signal images then individual signal images should be de-noised, when the system is trained with averaged signal images then an averaged signal images should be de-noised, and when the system is trained with combined signal images then combined signal images should be de-noised.

According to a preferred training method, a noise map is calculated for each image dataset based on the standard deviation of the noise for every pixel of the signal images of the respective image dataset.

According to a preferred training method, the loss function comprises a norm of the difference between the input image y and the output image, especially the Euclidean norm, preferably in the form of a mean squared error $\|f(y)-y\|^2$.

According to a preferred training method, the loss function is based on a physics-driven noise model. It is preferred that the loss function incorporates the noise model $\sigma$ in the form of a sum of squared noise maps $\sigma$, especially together with a sum of the squared noise maps $\sigma$ multiplied by the partial differentiation of the output of the system, $$\sum_{d=1}^{D}\sigma_d^2 \text{ and/or } 2\sum_{d=1}^{D}\sigma_d^2\frac{\partial f_d(y)}{\partial y_d}.$$

The loss function preferably comprises a term with the components $$\|f(y)-y\|^2-\sum_{d=1}^{D}\sigma_d^2+2\sum_{d=1}^{D}\sigma_d^2\frac{\partial f_d(y)}{\partial y_d}.$$

According to a preferred training method, at least a part of the image datasets, especially every image dataset, is not connected to any ground-truth data. The training may also be accomplished without any ground truth (unsupervised). It should be noted that for many applications, e.g., in diffusion-weighted imaging (DWI), there are simply no noise-free images that could be used as ground truth.

A preferred system comprises a plurality of layers of bilateral filters. These filters are preferably connected in a serial manner, especially in the form of layers. In a preferred architecture, at least an output of a first bilateral filter of a first layer is used as input for a second bilateral filter of a second layer. Trainable bilateral filters are well known in the art. The input interface provides an input image to the filters of the system.

The training method is then designed for training the number of bilateral filters based on the image datasets and the number of noise maps and based on calculating analytical gradients of a loss function with respect to filter parameters of the system, wherein at least one of the loss functions is based on Stein's unbiased risk estimator.

Combining both trainable bilateral filters together with the SURE-based training strategy for image de-noising, a system (especially a neural network) that is built from trainable bilateral filter layers can be trained without any ground-truth data for noise-reduction.

The system may comprise only one bilateral filter; however, two or more bilateral filters are preferred, especially two, three, or four. As already said above, a serial arrangement of filters is preferred. However, also a parallel arrangement of filters or a parallel arrangement of serially arranged filters could be advantageous, especially in the case there are two or more sub-images, e.g. one real image contribution and one imaginary image contribution of a complex image.

A bilateral filter assigns a new value to each pixel by calculating a weighted average of values from neighboring pixels $y_n$ with n being an integer>0 based on both spatial and intensity distances, so that:

$$x_i = \frac{1}{w_i}\sum_{n}^{N} f_s(p_i - p_n) f_r(y_i - y_n) y_n \tag{2}$$

with pixel position p and normalization factor $w_i$ defined as $$w_i = \sum_{n}^{N} f_s(p_i - p_n) f_r(y_i - y_n). \tag{3}$$

Spatial filter kernel $f_s$ and intensity range kernel $f_r$ can be expressed as Gaussian functions. In the two-dimensional case, they are defined as $$f_s(d) = \exp\left(\frac{-a_x}{2\kappa_x^2} - \frac{a_y}{2\kappa_y^2}\right) \tag{4}$$

$$f_r(d) = \exp\left(\frac{-a}{2\kappa_r^2}\right) \tag{5}$$

with $a_x=P_{ix}-P_{nx}$, $a_y=P_{ny}-P_{ny}$ (the distance in two dimensions) and $a=y_i-y_n$.

Hence, the bilateral filter contains especially three tunable parameters that are usually hand-picked by the user. In their work, Wagner et al. (see "Ultra low-parameter denoising: Trainable bilateral filter layers in computed tomography," Medical Physics, 2022) introduced a differentiable, trainable bilateral filter layer that directly optimizes its filter parameters by calculating analytical gradients of a loss function with respect to each parameter. The loss can then be propagated into previous layers via back-propagation.

In this way, a neural network architecture can be designed by stacking multiple bilateral filter layers similar to, e.g., convolutional layers. With the combination of multiple consecutive bilateral filters and the gradient-based optimization of filter parameters, trainable bilateral filter layers are generally more flexible and powerful than conventional bilateral filters. The filters are preferably trained together (in a combined manner) so that the noise map is applied for the output of the last filter (i.e., the output of the system).

According to a preferred training method, the loss of the loss function is propagated into previous layers via back-propagation. Here, the derivative of the loss is calculated with respect to each individual trainable model parameter. This is preferably done via the chain and product rules of differentiation. Popular deep learning frameworks like PyTorch automatically calculate these derivatives with respect to each trainable parameter as all their functions are differentiably implemented. It is preferred that after back-propagating the loss to each trainable model parameter, a global update step is conducted that changes all trainable parameters according to the respectively backpropagated loss. All filter layers are preferably trained simultaneously. It is preferred that only the output of the last layer is used for the loss calculation.

Other objects and features of the present disclosure will become apparent from the following detailed descriptions considered in conjunction with the accompanying drawings. It is to be understood, however, that the drawings are designed solely for the purposes of illustration and not as a definition of the limits of the disclosure.

BRIEF DESCRIPTION OF THE DRAWINGS

In the diagrams, like numbers refer to like objects throughout. Objects in the diagrams are not necessarily drawn to scale.

DETAILED DESCRIPTION

Figure 1:
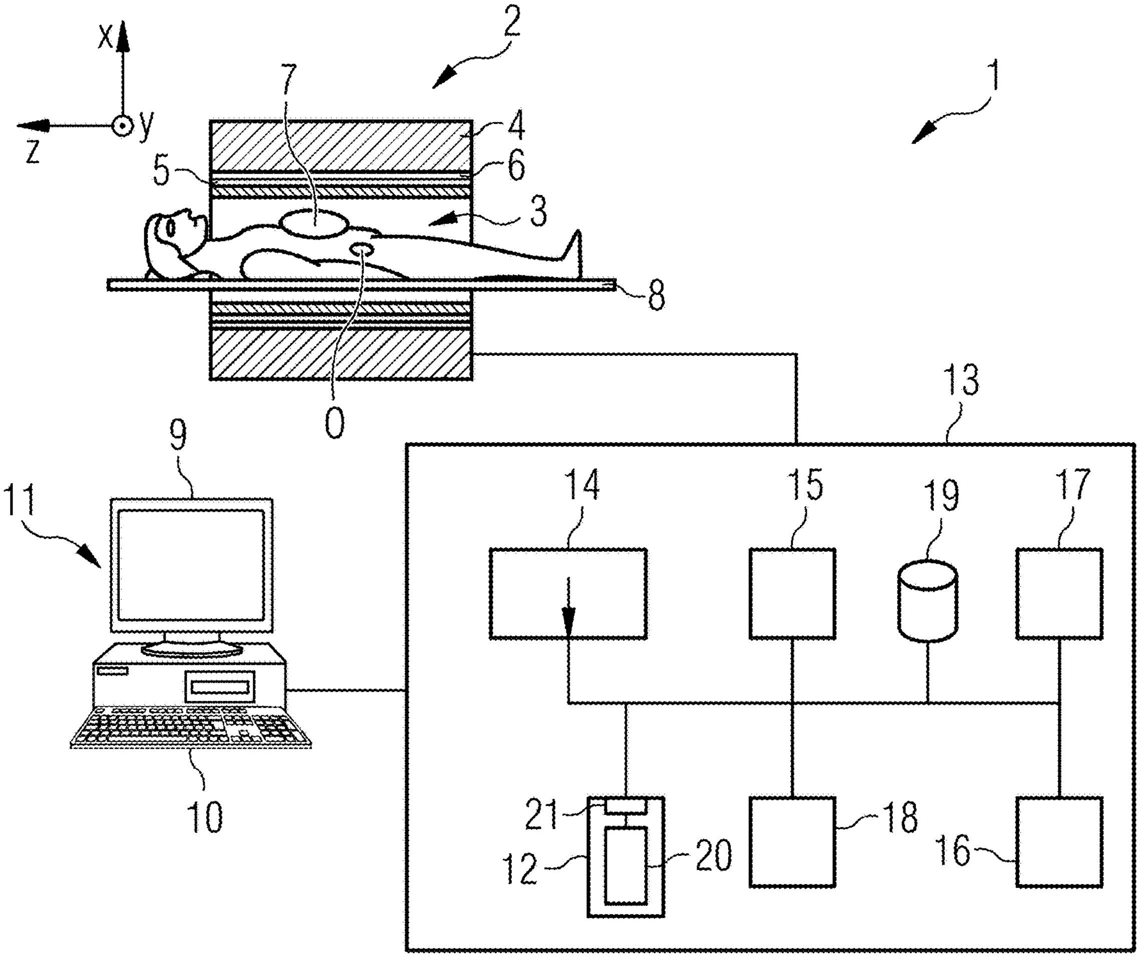
FIG. 1 shows a simplified MRI system according to an aspect of the disclosure.

FIG. 1 shows a schematic representation of a magnetic resonance imaging system 1 ("MRI-system"). The MRI system 1 includes the actual magnetic resonance scanner (data acquisition unit) 2 with an examination space 3 or patient tunnel in which a patient or test person is positioned on a driven bed 8, in whose body the actual examination object O is located.

The magnetic resonance scanner 2 is typically equipped with a basic field magnet system 4, a gradient system 6 as well as an RF transmission antenna system 5 and an RF reception antenna system 7. In the shown exemplary aspect, the RF transmission antenna system 5 is a whole-body coil permanently installed in the magnetic resonance scanner 2, in contrast to which the RF reception antenna system 7 is formed as local coils (symbolized here by only a single local coil) to be arranged on the patient or test subject. In principle, however, the whole-body coil can also be used as an RF reception antenna system, and the local coils can respectively be switched into different operating modes.

The basic field magnet system 4 is designed to generate a basic magnetic field in the longitudinal direction of the patient, i.e., along the longitudinal axis of the magnetic resonance scanner 2 that proceeds in the z-direction. The gradient system 6 typically includes individually controllable gradient coils in order to be able to switch (activate) gradients in the x-direction, y-direction or z-direction independently of one another.

The MRI system 1 shown here is a whole-body system with a patient tunnel into which a patient can be completely introduced. However, in principle, the disclosure can also be used in other MRI systems, for example, with a laterally open, C-shaped housing, as well as in smaller magnetic resonance scanners in which only one body part can be positioned.

Furthermore, the MRI system 1 has a central control device 13 that is used to control the MRI system 1. This central control device 13 (or "control unit" 13) includes a sequence control unit 14 for measurement sequence control. With this sequence control unit 14, the series of radio-frequency pulses (RF pulses) and gradient pulses can be controlled depending on a selected pulse sequence to acquire magnetic resonance images within a measurement session. For example, such a series of pulse sequences can be predetermined within a measurement or control protocol. Different control protocols for different measurements or measurement sessions are typically stored in a memory 19. They can be selected by an operator (and possibly modified as necessary) and then be used to implement the measurement.

To output the individual RF pulses of a pulse sequence, the central control device 13 has a radio-frequency transmission device 15 that generates and amplifies the RF pulses and feeds them into the RF transmission antenna system 5 via a suitable interface (not shown in detail). To control the gradient coils of the gradient system 6, the control device 13 has a gradient system interface 16. The sequence control unit 14 communicates in a suitable manner with the radio-frequency transmission device 15 and the gradient system interface 16 to emit the pulse sequence.

Moreover, the control device 13 has a radio-frequency reception device 17 (likewise communicating with the sequence control unit 14 in a suitable manner) in order to acquire magnetic resonance signals (i.e., raw data) for the individual measurements, which magnetic resonance signals are received in a coordinated manner from the RF reception antenna system 7 within the scope of the pulse sequence.

A reconstruction unit 18 receives the acquired raw data and reconstructs magnetic resonance image data therefrom for the measurements. This reconstruction is typically performed according to the present disclosure. The image data can then be outputted or stored in a memory 19.

Operation of the central control device 13 can take place via a terminal 10 with an input unit and a display unit 9, via which the entire MRI system 1 can thus also be operated by an operator. MR images can also be displayed at the display unit 9, and measurements can be planned and started by means of the input unit (possibly in combination with the display unit 9), and in particular suitable control protocols can be selected (and possibly modified) with suitable series of pulse sequences.

The control unit 13 comprises a system 12 for de-noising an image comprising an input interface 21 and a machine learning model 20 having an architecture designed for de-noising images provided by the input interface 21. This system 12, respectively its machine learning model 20, is trained with a training method as shown in the following figures.

The MRI system 1, according to the disclosure, and in particular the control device 13, can have a number of additional components that are not shown in detail but are typically present in such systems, for example, a network interface in order to connect the entire system with a network and be able to exchange raw data and/or image data or, respectively, parameter maps, but also additional data (for example patient-relevant data or control protocols).

The manner by which suitable raw data are acquired by radiation of RF pulses and the generation of gradient fields and MR images are reconstructed from the raw data is known to those skilled in the art and thus need not be explained in detail herein.

Figure 2:
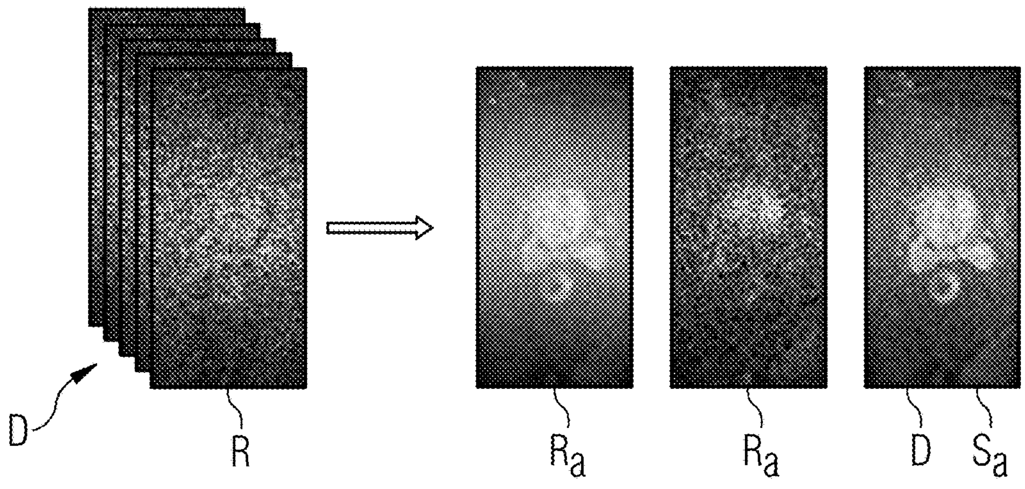
FIG. 2 shows results of different averaging of images.

FIG. 2 shows results of different averaging of images. An image dataset D comprising a plurality of image repetitions R of a prostate scan is shown on the left. In this and also in the following figures, these image repetitions R are MRI images, e.g., acquired with the MRI system of FIG. 1. The image repetitions R of each image dataset D are acquired with the same acquisition parameters.

The first image on the right (from left to right) is an averaged image repetition $R_a$ wherein first the magnitude of pixels is calculated, and then the pixels of the image repetitions are averaged. The second image on the right (from left to right) is an averaged image repetition $R_a$ wherein first, the complex-valued images are averaged, and then the magnitude is calculated.

The third image on the right (from left to right) is an averaged signal image $S_a$ (and a possible signal image S for training since it comprises the relevant information of all signal images S), wherein first a phase correction is performed on the complex-valued images, and then the images are averaged. Note that the Gaussian noise distribution is preserved only for the averaged signal image $S_a$.

It should be noted that the training method can be performed with the pure phase-corrected image repetitions R (i.e., with the resulting signal images S) as well as with the averaged signal images $S_a$.

Figure 3:
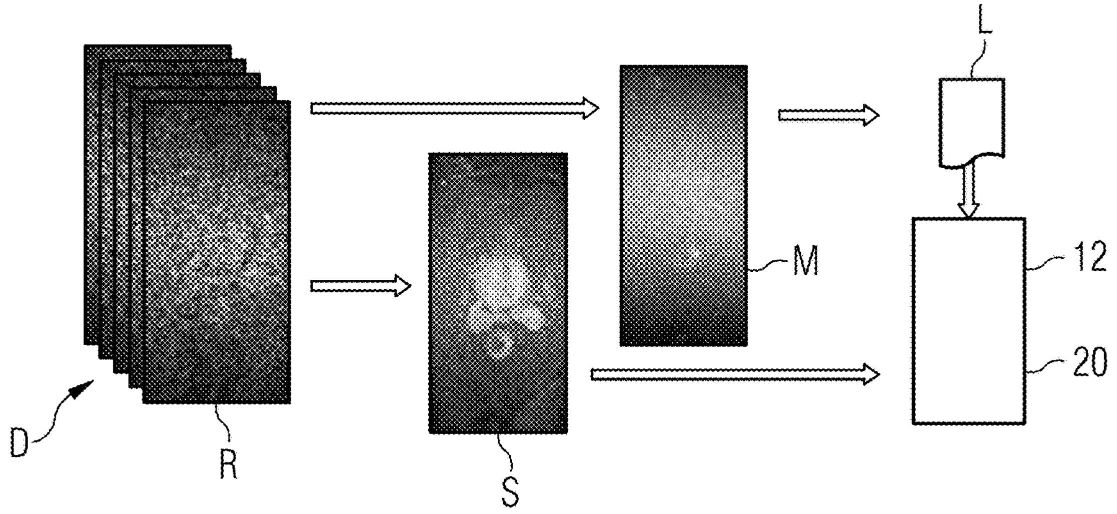
FIG. 3 outlines a simple example of a training method.

FIG. 3 outlines a simple example of a training method for system 12, as e.g. shown in FIG. 1, for de-noising images. From left to right there is provided an image dataset D symbolizing numerous image datasets D as input for the system 12. Each image dataset D comprises a plurality of complex-valued image repetitions R. Then a phase correction is performed on the image repetitions R. Each phase-corrected image repetition R results in a signal image S comprising signal contribution.

The phase correction (for the separation of signal and phase-related noise) is performed by rotating the image repetitions R in an image space. For example, when the image repetitions R are complex images with a real image part and an imaginary image part, the values of the image repetitions R are rotated in the complex space by the formula $e^{ix}$. Here only one signal image S is shown. It could also represent an average over the signal images S of an image dataset.

In addition, a noise map M is calculated for an image dataset D based on the standard deviation between the signal images S of this image dataset D.

Then, the machine learning model 20 of the system 12 is trained based on the signal images S, the noise map M and a loss function L based on Stein's unbiased risk estimator ("SURE loss" L).

Figure 4:
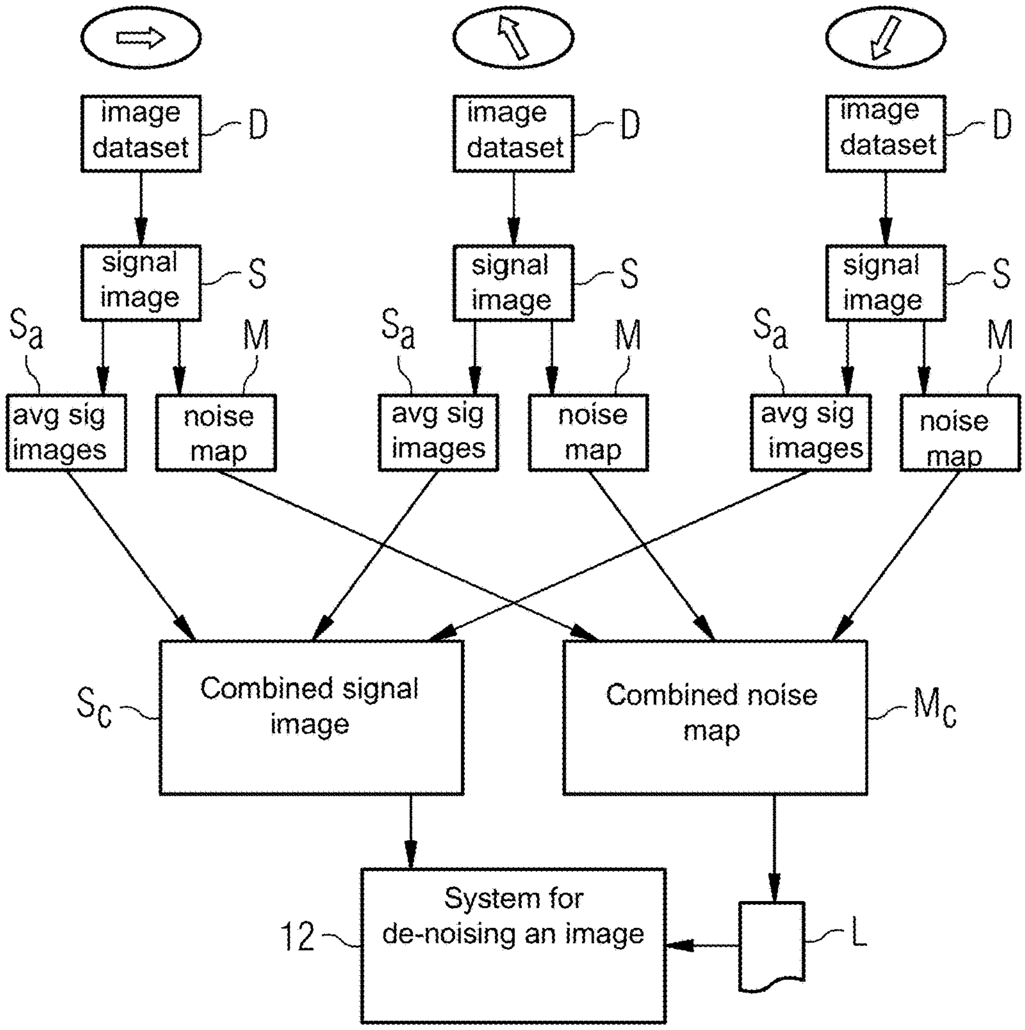
FIG. 4 shows a block diagram of the process flow of a preferred training method according to the disclosure.

FIG. 4 shows a block diagram of the process flow of a preferred training method according to the disclosure. In this example, there are three image datasets D that are acquired with different acquisition parameters, being here different diffusion encodings (indicated by the arrows on the top). Each image dataset D is phase-corrected, resulting in three individual sets of signal images S. Each set of signal images S is averaged to form one averaged signal image $S_a$ each. In addition, three noise maps M, one for each image dataset D are calculated with the standard deviations from the respective sets of signal images S.

The three averaged signal images $S_a$ are then combined to form a combined signal image $S_c$. Also, the three noise maps M are combined to form a combined noise map $M_c$. This could simply be done by stacking the averaged signal images $S_a$ to form a multi-channel image as combined signal image $S_c$ and also by stacking the noise maps M.

Then, the training is performed as already described above. However, it should be noted that in other examples, the training can also be performed with the averaged signal images $S_a$ or the signal images S.

Figure 5:
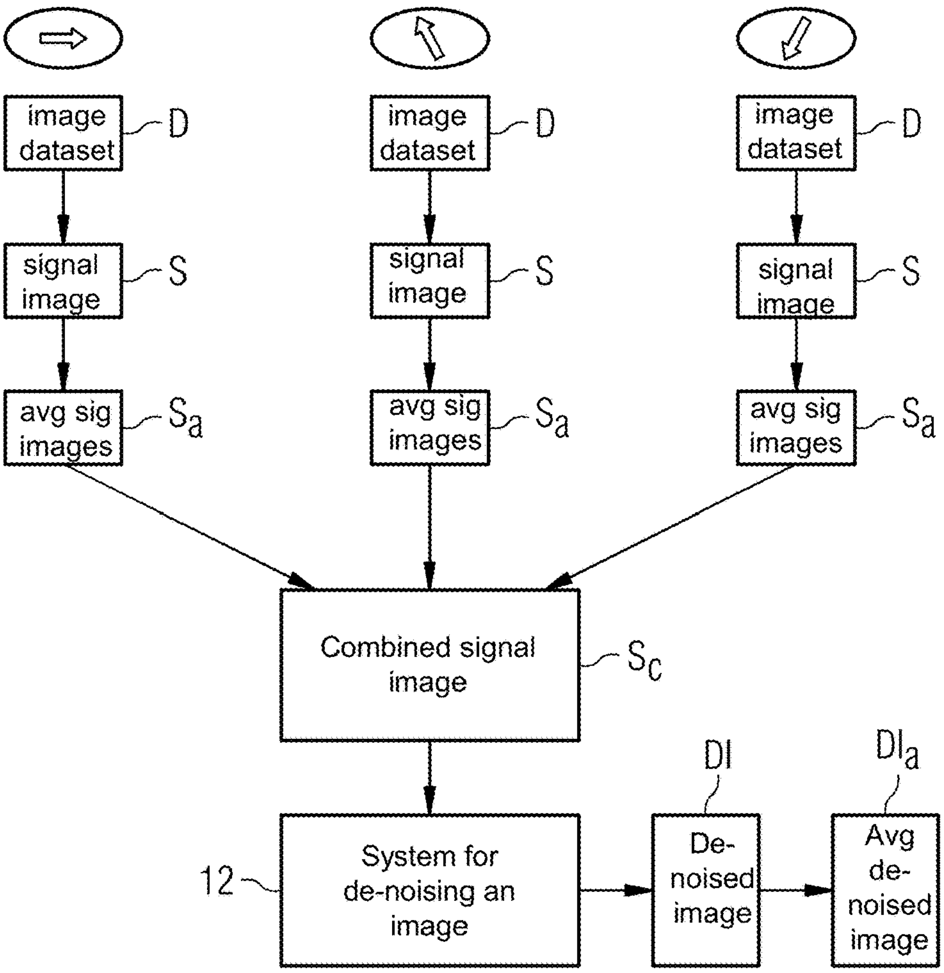
FIG. 5 shows a block diagram of the process flow of a preferred method for de-noising according to the disclosure.

FIG. 5 shows a block diagram of the process flow of a preferred method for de-noising according to the disclosure. The system 12 is here trained as shown in FIG. 4. Since the input of a trained model should be similar to the training data, the input to the system 12 is a combined signal image $S_c$.

Before inputting this combined signal image $S_c$ into the system 12 it has to be created. This is done as already described above in the course of FIG. 4: Image datasets D are phase-corrected, and the resulting signal images S are averaged and stacked to form the combined signal image $S_c$.

In contrast to FIG. 4, no noise maps are needed since the de-noising is integrated into the trained system 12. The output is a de-noised image DI that is a multi-channel image as the combined signal image $S_c$. This de-noised image DI could be averaged again to form an averaged de-noised image $DI_a$. This could especially be performed by calculating the geometric mean, e.g., a trace image in the case of DWI.

Figure 6:
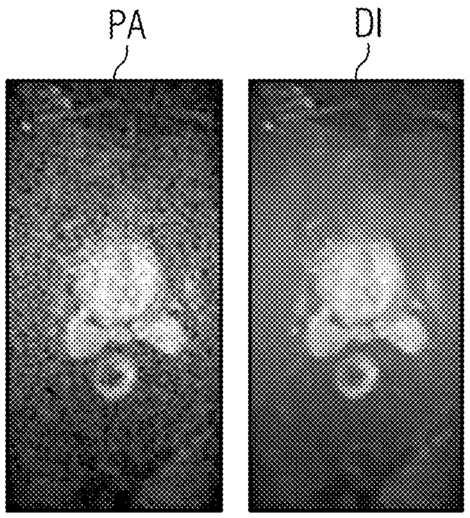
FIG. 6 shows two de-noised images.

FIG. 6 shows two de-noised images. On the left, there is a de-noised image according to the prior art. On the right, there is a de-noised image DI according to the disclosure. The noise of this image is seriously reduced.

Although the present disclosure has been disclosed in the form of preferred aspects and variations thereon, it will be understood that numerous additional modifications and variations could be made thereto without departing from the scope of the disclosure. For the sake of clarity, it is to be understood that the use of "a" or "an" throughout this application does not exclude a plurality, and "comprising" does not exclude other steps or elements. The mention of a "unit" or a "module" does not preclude the use of more than one unit or module. The expression "pair" could mean not only two but also a "set of." The expression "a number" means "at least one". Independent of the grammatical term usage, individuals with male, female, or other gender identities are included within the term.

The invention claimed is:

1. A training method for a system for de-noising images, the system comprising an input interface and a machine learning model having an architecture designed for de-noising images provided by the input interface, the training method comprising:

providing numerous image datasets as input for the system, wherein each image dataset comprises a plurality of complex-valued image repetitions;

performing a phase correction on the image repetitions, wherein for each provided image repetition of an image dataset a phase-corrected signal image is calculated by amending the phase of the complex-valued image repetition such that the phases of the image repetitions of the image dataset are consistent and such that the signal image comprises signal contribution of the image repetition;

calculating a noise map for an image dataset based on a standard deviation between the signal images of this image dataset; and training the machine learning model based on the signal images, the noise map, and a loss function based on Stein's unbiased risk estimator.

2. The training method according to claim 1, wherein the phase correction is performed by rotating the phase of the image repetitions in an image space.

3. The training method according to claim 2, wherein the image repetitions are complex images with a real image part and an imaginary image part, and values of the image repetitions are rotated in complex space.

4. The training method according to claim 3, wherein the rotation is such that a part of the image space with a phase-related noise contribution is a noise image and the other part of the image space is the signal image.

5. The training method according to claim 1, wherein image datasets are acquired with different acquisition parameters and each image dataset is phase-corrected individually and a noise map is calculated for each image dataset.

6. The training method according to claim 5, wherein the image repetitions of each image dataset are MRI images, and each image dataset is acquired with individual acquisition parameters.

7. The training method according to claim 6, wherein after the phase correction, signal images of the same image dataset are combined as one average signal image.

8. The training method according to claim 7, wherein signal images of different image datasets are stacked to form a combined signal image.

9. The training method according to claim 8, wherein the combined signal image comprises signal contributions of all acquired image repetitions.

10. The training method according to claim 1, wherein a noise map is calculated for each image dataset based on a standard deviation of the noise for every pixel of the signal images of the respective image dataset.

11. The training method according to claim 1, wherein the loss function comprises a norm of a difference between an input image and an output image.

12. The training method according to claim 1, wherein the loss function comprises a Euclidean norm of a difference between an input image and an output image in a form of a mean squared error.

13. The training method according to claim 11, wherein the loss function incorporates a noise map σ in a form of:

$$\sum_{d=1}^{D}\sigma_d^2 \text{ and/or } 2\sum_{d=1}^{D}\sigma_d^2\frac{\partial f_d(y)}{\partial y_d},$$

where D is an image dataset, y is an input image, and f(y) is an output image.

14. The training method according to claim 1, wherein at least a part of the image datasets is not connected to any ground-truth data.

15. A system for de-noising an image comprising an input interface and a machine learning model having an architecture designed for de-noising images provided by the input interface, wherein the machine learning model is trained with a training method according to claim 1.

16. A method for de-noising an image with a system according to claim 15, comprising:

providing numerous image datasets as input for the system, wherein each image dataset comprises a plurality of complex-valued image repetitions;

performing a phase correction on the image repetitions, wherein each provided image repetition of an image dataset a phase-corrected signal image is calculated by amending the phase of the complex-valued image repetition such that the phases of the image repetitions of the image dataset are consistent and such that the signal image comprises signal contribution of the image repetition;

de-noising the signal images of the image datasets with the system; and outputting a number of de-noised images.

17. The method according to claim 16, wherein a plurality of image datasets is provided each image dataset acquired with different acquisition parameters.

18. The method according to claim 17, the image repetitions are MRI images acquired with different diffusion encoding and/or different b-values.

19. The method according to claim 18, wherein averaged signal images are calculated from individual image datasets of the plurality of the image datasets and these averaged signal images are de-noised.

20. A non-transitory computer-readable storage medium comprising instructions which, when executed by a computer, cause the computer to carry out the steps of the training method of claim 1.

* * * * *